US008415011B2

(12) United States Patent
Sankey et al.

(10) Patent No.: US 8,415,011 B2
(45) Date of Patent: Apr. 9, 2013

(54) BREATHABLE, HEAT-SEALABLE COMPOSITE POLYMERIC FILM

(75) Inventors: Stephen William Sankey, North Yorkshire (GB); Dominic Hoy, Teesside (GB); David Turner, Newcastle Upon Tyne (GB)

(73) Assignee: DuPont Teijin Films U.S. Limited Partnership, Chester, VA (US)

( * ) Notice: Subject to any disclaimer, the term of this patent is extended or adjusted under 35 U.S.C. 154(b) by 0 days.

(21) Appl. No.: 11/795,368

(22) PCT Filed: Jan. 11, 2006

(86) PCT No.: PCT/GB2006/000086
§ 371 (c)(1),
(2), (4) Date: Oct. 1, 2007

(87) PCT Pub. No.: WO2006/075151
PCT Pub. Date: Jul. 20, 2006

(65) Prior Publication Data
US 2008/0118192 A1 May 22, 2008

(30) Foreign Application Priority Data
Jan. 17, 2005 (GB) .................................. 0500906.3

(51) Int. Cl.
*B32B 27/08* (2006.01)
*B32B 27/30* (2006.01)
*B32B 27/36* (2006.01)
*B65D 85/50* (2006.01)
*B65D 85/52* (2006.01)

(52) U.S. Cl. ........ 428/349; 428/213; 428/215; 428/343; 428/346; 428/347; 428/355 R; 428/355 EN; 428/480; 428/483; 528/272; 528/300; 528/302; 528/305; 528/308; 528/308.6; 528/308.7; 206/423

(58) Field of Classification Search ........................ None
See application file for complete search history.

(56) References Cited

U.S. PATENT DOCUMENTS

| | | | | |
|---|---|---|---|---|
| 3,023,192 A * | 2/1962 | Shivers, Jr. | ................... | 528/300 |
| 3,522,215 A * | 7/1970 | Sardessai et al. | ............. | 528/295 |
| 3,832,314 A * | 8/1974 | Hoh et al. | ...................... | 523/506 |
| 4,003,882 A * | 1/1977 | Fagerburg et al. | ............ | 528/301 |
| 4,187,113 A * | 2/1980 | Mathews et al. | .............. | 430/533 |
| 4,233,354 A * | 11/1980 | Hasegawa et al. | ......... | 428/195.1 |
| 4,256,860 A * | 3/1981 | Davis et al. | ................... | 525/437 |
| 4,328,333 A * | 5/1982 | Barbee et al. | ................. | 528/301 |
| 4,349,469 A * | 9/1982 | Davis et al. | ................... | 524/765 |
| 4,725,481 A * | 2/1988 | Ostapchenko | ................ | 428/213 |
| 4,739,012 A * | 4/1988 | Hagman | ..................... | 525/92 A |
| 4,897,453 A * | 1/1990 | Flora et al. | .................... | 525/439 |
| 5,171,308 A * | 12/1992 | Gallagher et al. | ............ | 604/365 |
| 5,219,646 A * | 6/1993 | Gallagher et al. | ............ | 442/361 |
| 5,288,781 A * | 2/1994 | Song et al. | ..................... | 524/167 |
| 5,292,783 A * | 3/1994 | Buchanan et al. | .............. | 524/37 |
| 5,342,902 A * | 8/1994 | Darnell et al. | ................. | 525/437 |
| 5,445,874 A * | 8/1995 | Shehata | ........................ | 442/287 |
| 5,588,217 A | 12/1996 | Lindner et al. | | |
| 5,637,631 A * | 6/1997 | Kitada et al. | .................... | 524/81 |
| 5,743,398 A * | 4/1998 | Weder | ........................... | 206/423 |
| 5,811,493 A * | 9/1998 | Kent | .............................. | 525/92 F |
| 5,938,648 A * | 8/1999 | LaVon et al. | .................. | 604/358 |
| 6,133,168 A | 10/2000 | Doyle et al. | | |
| 6,183,856 B1* | 2/2001 | Amon | ........................ | 428/318.4 |
| 6,287,680 B1* | 9/2001 | Sasaki et al. | ............... | 428/317.9 |
| 6,342,304 B1* | 1/2002 | Buchanan et al. | ............ | 428/480 |
| 6,358,604 B1 | 3/2002 | Peiffer | | |
| 6,595,656 B2* | 7/2003 | Yoda | ............................. | 362/187 |
| 6,599,994 B2* | 7/2003 | Shelby et al. | .................. | 525/444 |
| 6,677,258 B2* | 1/2004 | Carroll et al. | .................. | 442/394 |
| 7,144,632 B2* | 12/2006 | Hayes | ........................ | 428/423.7 |
| 7,169,880 B2* | 1/2007 | Shelby et al. | ................. | 528/206 |
| 7,179,245 B2* | 2/2007 | Giori | ............................. | 604/332 |
| 7,270,723 B2* | 9/2007 | McCormack et al. | ........ | 156/229 |
| 2001/0008240 A1 | 7/2001 | Herrin | | |
| 2002/0187694 A1 | 12/2002 | Brighton et al. | | |
| 2003/0021925 A1 | 1/2003 | Schmal et al. | | |
| 2003/0157852 A1 | 8/2003 | Honna | | |
| 2006/0165958 A1* | 7/2006 | Sankey et al. | ................. | 428/138 |

FOREIGN PATENT DOCUMENTS

| | | |
|---|---|---|
| DE | 100 02 151 A1 | 7/2001 |
| EP | 0178218 | 4/1986 |
| EP | 0 265 544 A | 5/1988 |
| EP | 0358 461 | 3/1990 |
| EP | 0 803 348 A | 10/1997 |
| EP | 0 976 548 A | 2/2000 |
| EP | 1264684 | 12/2002 |
| GB | 838708 | 6/1960 |
| GB | 2 355 956 A | 5/2001 |
| JP | 54117582 | 9/1979 |
| JP | 6165636 | 6/1994 |
| JP | 6219465 | 8/1994 |
| JP | 11035666 | 2/1999 |
| JP | 200052523 | 2/2000 |
| JP | 2001158071 | 6/2001 |
| WO | WO 01/92000 A1 | 12/2001 |
| WO | WO 2005/007531 | 1/2005 |

OTHER PUBLICATIONS

Schimtz, Peter et al., "Films." Ullmann's Encyclopedia of Industrial Chemistry, 5th Ed., vol. A11 (1988), pp. 85-110.*
Peter M. A. Toivonen, et al.; Non-ethylene, Non-respiratory Volatiles in Harvested Fruits and Vegetables: Their Occurrence, Biological Activity and Control; Magazine—Postharvest Biology and Technology, vol. 12, No. 2, Oct. 1997, pp. 109-125; Publisher—Elsevier; Summerland, Canada.

* cited by examiner

*Primary Examiner* — Vivian Chen
(74) *Attorney, Agent, or Firm* — RatnerPrestia

(57) ABSTRACT

A breathable, heat-sealable composite film comprising first and second layers of polymeric material wherein (i) the polymeric material of the first layer comprises copolyester comprising monomeric units derived from one or more diol(s); one or more dicarboxylic acid(s); and one or more poly(alkylene oxide) glycol(s); and (ii) the second layer is a heat-sealable polymeric layer, and a process for the production thereof.

35 Claims, No Drawings

BREATHABLE, HEAT-SEALABLE COMPOSITE POLYMERIC FILM

This application is the National Stage filing of PCT Application No. PCT/GB2006/000086, filed 11 Jan. 2006, which claims priority of UK Application No. GB0500906.3, filed 17 Jan. 2005.

This invention relates to breathable polymeric film, and a process for the production thereof.

BACKGROUND OF THE INVENTION

Plastic film, particularly polyolefin film, has long been used in the packaging of fresh-cut flowers and vegetables. The primary function of such packaging film is to provide a protective seal against insects, bacteria and air-borne contaminants.

Nevertheless, fresh-cut flowers and vegetables have a limited shelf life due to fundamental changes in their biochemistry. Whilst in soil, photosynthesis allows the plant to grow and expire oxygen. However, after harvesting, the plant no longer converts sunlight and carbon dioxide into carbohydrates and oxygen, but uses its stores of carbohydrate to excrete water and carbon dioxide. For plants that are wrapped in plastic packaging, the accumulation of trapped water in the packaging leads to fungal growths and rotting of the fresh food. A study of volatiles produced by fruits and vegetables has been made by P.M.A. Toivonen ("Non-ethylene, non-respiratory volatiles in harvested fruits and vegetables; their occurrence, biological activity and control", Postharvest Biology and Technology 12 (1997) 109-125). Plastic packaging film, particularly polyolefin film, acts as a water barrier and can actually make this situation worse by trapping excreted water within the package. Vegetables having a high moisture content, such as broccoli and mushrooms, are particularly susceptible. It would be desirable to provide packaging which not only provides a barrier to insects, bacteria and air-borne contaminants but which is also breathable to water (in other words, a film which would allow water to freely pass out of the packaging), thereby increasing the shelf life of the contents by delaying the onset of microbial and fungal growth.

There already exist a number of commercially available breathable films. Several companies market polyolefin films which have been voided using inorganic fillers thereby allowing easier passage of water. However, such films are not normally transparent and therefore have a disadvantage from a marketing standpoint. Other commercially available films based on thermoplastic elastomers (TPEs) provide excellent breathability but are expensive for packaging applications.

Another approach to the manufacture of breathable packaging has been to perforate the film in order to allow egress of excreted gas. The number of perforations per unit area and the perforation diameter may be adjusted depending on the goods to be packaged and the respiration rate thereof. The disadvantage of this approach is that the perforations expose the packaged goods to insects, bacteria and air-borne contaminants. Optionally heat-sealable composite films comprising a perforated layer are disclosed in WO-01/92000-A, GB-2355956-A, EP-0358461-A; EP-0178218-A; US-2002/0187694-A; JP-A-06/219465-A; JP-06/165636-A; and JP-54/117582-A. Co-pending application PCT/GB2004/003119 describes a breathable, heat-sealable, composite film comprising a perforated polymeric substrate layer and an unperforated barrier layer coated on a surface of the substrate.

It is an object of this invention to provide a breathable, heat-sealable packaging film which allows egress of moisture and excreted gas, particularly moisture, from the packaged product but which provides a physical barrier to insects, bacteria and airborne contaminants, particularly wherein the film is optically clear, and particularly wherein the manufacturing of the film can be achieved more efficiently and economically.

SUMMARY OF THE INVENTION

According to the present invention, there is provided a breathable, heat-sealable, composite film comprising first and second layers of polymeric material wherein:
(i) the polymeric material of the first layer comprises copolyester comprising monomeric units derived from one or more diol(s); one or more dicarboxylic acid(s); and one or more poly(alkylene oxide)glycol(s); and
(ii) the second layer is a heat-sealable polymeric layer.

DETAILED DESCRIPTION OF THE INVENTION

As used herein, the term "breathable" means that the composite film of the present invention is gas-permeable, particularly to water vapour and preferably also to oxygen.

Preferably, the composite film has a water vapour transmission rate (WVTR) of at least 60 g/m$^2$/day, preferably at least 80 g/m$^2$/day, preferably at least 90 g/m$^2$/day, preferably at least 100 g/m$^2$/day, preferably at least 115 g/m$^2$/day, preferably at least 130 g/m$^2$/day, preferably at least 140 g/m$^2$/day, and more preferably at least 150 g/m$^2$/day. The WVTR may be adjusted by variation of the film composition depending on the goods to be packaged and the respiration rate thereof.

In a preferred embodiment, the composite film is formed by coextrusion, with the first and second layers being coextruded according to conventional techniques in the art. In an alternative embodiment, the heat-sealable (second) layer is coated onto a substrate of the first layer as defined herein.

The composite film is a self-supporting film or sheet by which is meant a film or sheet capable of independent existence in the absence of a supporting base. The composite film is preferably uniaxially or biaxially oriented, preferably biaxially oriented.

The polymeric material of the first layer is preferably non-elastomeric, by which is meant that it does not have the elastic properties exhibited by natural rubber (such as resumption of the original shape when a deforming force is removed). The first layer preferably has an elongation to break of less than 250%, preferably less than 200%.

Suitable dicarboxylic acids for the copolyester of the first layer include aromatic acids such as terephthalic acid, isophthalic acid, phthalic acid and 2,5-, 2,6- or 2,7-naphthalene dicarboxylic acid, as well as aliphatic dicarboxylic acids such as succinic acid, sebacic acid, adipic acid and azelaic acid. Cycloaliphatic dicarboxylic acids may also be used. Other suitable dicarboxylic acids include 4,4'-diphenyldicarboxylic acid and hexahydro-terephthalic acid. Sulphonated aromatic dicarboxylic acids in which a sulfonate group is attached to the aromatic nucleus may also be used, and preferably the sulfonate group of such a sulfomonomer is a sulfonic acid salt, preferably a sulfonic acid salt of a Group I or Group II metal, preferably lithium, sodium or potassium, more preferably sodium. Ammonium salts may also be used. The sulphonated aromatic dicarboxylic acid may be selected from any suitable aromatic dicarboxylic acid, e.g. terephthalic acid, isophthalic acid, phthalic acid, 2,5-, 2,6- or 2,7-naphthalenedicarboxylic acid. However, preferably the aromatic dicarboxylic acid of the sulfomonomer is isophthalic acid. Preferred sulfomonomers are 5-sodium sulpho-isophthalic acid and 4-sodium sulpho-isophthalic acid. The term "dicarboxylic acids" as used herein includes acid equivalents of dicarboxylic acids having two functional carboxyl groups which perform substantially like dicarboxylic acids in reaction with glycols and diols in forming copolyesters, including esters and ester-forming derivatives, such as acid halides and anhydrides. The dicarboxylic acids preferably have a low molecular weight (i.e. a molecular weight of less than about 300, which refers to the molecular weight of the acid and not to its equivalent ester or ester-forming derivative).

The copolyester of the first layer preferably comprises at least one aromatic acid, particularly terephthalic or naphthalene dicarboxylic acids, and particularly terephthalic acid. In a first embodiment, the dicarboxylic acid component comprises only one dicarboxylic acid. In a second embodiment, the dicarboxylic acid component comprises a first aromatic dicarboxylic acid preferably terephthalic acid) and a second dicarboxylic acid. The second dicarboxylic acid may be selected from aliphatic dicarboxylic acids such as succinic acid, sebacic acid, adipic acid or azelaic acid, and in one embodiment the second dicarboxylic acid is azelaic acid. Alternatively, the second carboxylic acid may be selected from sulphonated aromatic dicarboxylic acids such as sodium sulpho-isophthalic acid. In these embodiments, the first dicarboxylic acid is preferably present in an amount of 50 to 100%, (preferably 60 to 99 mol %, preferably 70 to 95 mol %, preferably 80 to 90 mol %) of the total acid component, and the second dicarboxylic acid is preferably present in an amount of 0 to 50 mol % (preferably 1 to 40 mol %, preferably 5 to 30 mol %, preferably 5 to 15 mol %) of the total acid component. Where the second dicarboxylic acid is a sulphonated aromatic dicarboxylic acid, it is preferably present in amounts of 0 to 15% (preferably 0 to 10%, preferably 1 to 10%, preferably 2 to 6 mol %) of the total acid component. Preferably, the copolyester of the first layer comprises only one type of non-sulphonated aromatic dicarboxylic acid residue, and in one embodiment only one type of aromatic dicarboxylic residue. In one embodiment, at least 90 mol %, preferably at least 95 mol %, preferably at least 98 mol %, and preferably at least 99 mol % of the dicarboxylic acid fraction is made up of one type of non-sulphonated aromatic dicarboxylic acid.

Suitable diols for the copolyester of the first layer are low molecular weight diols (i.e having a molecular weight below about 250) including acyclic, alicyclic and aromatic dihydroxy compounds. Preferred compounds are diols with 2-15 carbon atoms such as ethylene, propylene, isobutylene, tetramethylene, 1,4-pentamethylene, 2,2-dimethyltrimethylene, hexamethylene and decamethylene glycols, dihydroxycyclohexane, cyclohexane dimethanol, resorcinol, hydroquinone, 1,5-dihydroxynaphthalene, etc. An aliphatic diol is preferred, especially acyclic aliphatic diols containing 2-8 carbon atoms, preferably ethylene glycol and 1,4-butanediol, more preferably ethylene glycol. Cycloaliphatic (alicyclic) glycols such as 1,4-cyclohexanedimethanol (CHDM) can also be used. Equivalent ester-forming derivatives of diols may be used in place of the diol. The term "low molecular weight diols" as used herein encompasses such equivalent ester-forming derivatives; provided that the molecular weight requirement pertains to the diol and not to its derivatives. Preferably, the copolyester of the first layer comprises only one type of low molecular weight diol residue. In one embodiment, at least 90 mol %, preferably at least 95 mol %, preferably at least 98 mol %, and preferably at least 99 mol % of the low molecular weight diol fraction is made up of one type of low molecular weight diol. Preferably, the low molecular weight diol fraction present in the copolyester is in the range of 50 mol % or more, preferably 55 mol % or more, preferably in the range of 60 to 90 mol %, and in one embodiment in the range of 60 to 80 mol %, of the total glycol fraction of the copolyester.

Suitable poly(alkylene oxide) glycols for the copolyester of the first layer are preferably selected from $C_2$ to $C_{15}$, preferably $C_2$ to $C_{10}$, preferably $C_2$ to $C_6$ alkylene chains, and preferably selected from polyethylene glycol (PEG), polypropylene glycol (PPG) and poly(tetramethylene oxide) glycol (PTMO), preferably polyethylene glycol. Ethylene oxide-terminated poly(propylene oxide) segments may also be used. Mixtures of poly(alkylene oxide) glycols can be used, but in a preferred embodiment the copolyester of the first layer comprises only one type of poly(alkylene oxide) glycol residue. The average molecular weight of a poly(alkylene oxide) glycol used in the present invention is preferably at least about 400 (and typically at least about 1000), and preferably no more than 10,000, preferably no more than 4500, and in one embodiment no more than 2500. The amount of poly(alkylene oxide) glycol present in a copolyester is preferably no more than 50 mol % of the glycol fraction of the copolyester, preferably no more than 45 mol %, and preferably in the range of 10 to 40 mol %, and in one embodiment in the range of 20 to 40 mol %.

Thus, in one embodiment, the copolyester of the first layer comprises monomer units derived from poly(alkylene oxide) glycol (preferably PEG), a low molecular weight aliphatic diol (preferably ethylene glycol), an aromatic dicarboxylic acid (preferably terephthalic acid) and a second additional dicarboxylic acid selected from aliphatic dicarboxylic acid(s) and sulphonated aromatic dicarboxylic acid(s).

The copolyesters used in the present invention may be described as block (segmented) copolymers comprising alternating random-length sequences joined by ester linkages having the general formula I:

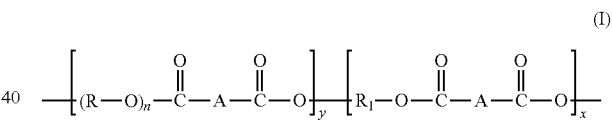

wherein
R is the alkylene chain from the poly(alkylene oxide) glycol, (preferably poly(ethylene oxide) glycol;
$R_1$ is derived from the low molecular weight diol(s) (preferably ethylene glycol);
A is an aromatic ring (preferably phenyl or naphthyl, and more preferably phenyl) derived from the aromatic dicarboxylic acid(s) (preferably terephthalic acid (TA), isophthalic acid (IPA) or 2,6-naphthalene dicarboxylic acid, and more preferably TA);
the ratio x:y is in the range of from about 3:1 to about 80:1 (and in one embodiment from greater than 40:1 to about 80:1);
y is preferably in the range of 1-3; and
n is the degree of polymerisation required to give the molecular weights recited hereinabove, and is typically in the range of 14-28.

In one embodiment x is in the range of 3-80, and in one embodiment from greater than 40 to about 200, and in a further embodiment from greater than 40 to about 80.

Where more than one low molecular weight diol and/or dicarboxylic acid is/are present, the number of different alternating blocks increases.

Suitable copolyesters for use in the first layer of the present invention preferably have a glass transition temperature (Tg)

of at least 0° C., preferably at least 15° C., preferably at least 30° C., and are preferably no more than 60° C., preferably no more than 55° C. Thus, in a preferred embodiment, the Tg of the copolyesters are in the range of from about 30° C. to about 60° C.

Preparation of the Copolyesters is Readily Achieved by Conventional Methods Well-Known in the art. Typically, a conventional ester interchange reaction is utilised, comprising heating an ester of the dicarboxylic acid, for example the dimethyl ester of terephthalic acid, with the poly(alkylene oxide)glycol and a molar excess of the low molecular weight diol in the presence of a catalyst at elevated temperature (typically in the range of about 150 to 260° C.), followed by distilling off the alcohol (e.g. methanol) formed by the interchange reaction. Alternatively, the direct esterification route may be used, which comprises heating at least one aromatic acid, for example terephthalic acid, with the poly(alkylene oxide) glycol and a molar excess of the low molecular weight diol in the presence of a catalyst at elevated temperature (typically in the range of about 150 to 260° C.) followed by distilling off the water formed by the esterification reaction. The next step in the synthesis is a conventional polycondensation step to increase the molecular weight of the polymer to the desired level. Preferably, an anti-foaming agent (such as a silicone oil, for example Dow Corning's DC1510) is utilised in the synthesis in order to reduce the risk of the autoclave becoming blocked with pre-polymer.

The polymeric material of the first layer preferably comprises greater than 50%, preferably at least 65%, preferably at least 80%, preferably at least 95% and preferably at least 99% of the aforementioned copolyester, the stated weights of copolyester being the percent by weight relative to the total amount of polymeric material in the first layer. Preferably the polymeric material of the first layer consists essentially of the aforementioned copolyester.

The thickness of the first layer is typically from about 0.5 to 300 μm, preferably from 12 to about 200 μm and particularly from about 12 to about 100 μm.

The polymeric material of the second layer is heat-sealable. The polymeric material of the second layer should soften to a sufficient extent that its viscosity becomes low enough to allow adequate wetting for it to adhere to the surface to which it is being bonded. Preferably, the composite film exhibits a heat-seal strength to itself (i.e. by contacting its heat-sealable second layers) of at least 300 g/25 mm, preferably from about 400 g/25 mm to about 1000 g/25 mm, and more preferably from about 500 to about 850 g/25 mm. The polymeric material of the first layer does not provide an effective heat-seal property, and does not exhibit a heat-seal strength to itself of at least 300 g/25 mm.

In one embodiment, hereinafter referred to as Embodiment A, the second layer may comprise any suitable conventional heat-sealable polymeric material and has a thickness such that it does not significantly impair the breathable characteristics of the first layer. Preferably, the WVTR of the composite film comprising the first and second layer as defined herein should be no more than 50%, preferably no more than 35%, preferably no more than 20% and preferably no more than 10% lower than the WVTR of the first layer in isolation. With regard to the thickness of the heat-sealable layer of Embodiment A, there is an inverse correlation between the layer thickness and the WVTR of the composite film and, in general, as the thickness of the second layer doubles, the WVTR of the composite film halves. Suitable polymeric materials for Embodiment A include heat-sealable polyesters. The polyester is typically a copolyester and is derived from a first dicarboxylic acid and a first low molecular weight diol, and optionally a second dicarboxylic acid and/or second low molecular weight diol. Preferably, the copolyester comprises either a second dicarboxylic acid residue or a second low molecular weight diol residue.

In an alternative embodiment, hereinafter referred to as Embodiment B, the polymeric material of the second layer comprises a copolyester similar to that of the first layer, but wherein the copolyester of the second layer differs by the incorporation of an additional comonomer, not present in the copolyester of the first layer, which imparts heat-sealability (as defined herein) to the second layer. The molar fraction of poly(alkylene oxide) glycol in the two copolyesters may be the same or different, but is preferably substantially the same. The additional comonomer is incorporated into the copolyester at the expense of the dicarboxylic acid fraction and/or the low molecular weight diol fraction, and in a preferred embodiment at the expense of either the dicarboxylic acid fraction or the low molecular weight diol fraction. In one embodiment, the additional co-monomer is incorporated into the copolyester at the expense of the dicarboxylic acid fraction. Suitable comonomers include isophthalic acid and a low molecular weight aliphatic diol (particularly a cycloaliphatic diol such as CHDM).

In one embodiment, hereinafter referred to as Embodiment A1, the second layer comprises a copolyester derived from an aliphatic glycol (preferably ethylene glycol), a first aromatic dicarboxylic acid (preferably terephthalic acid) and a second dicarboxylic acid (preferably isophthalic acid). Thus, a preferred copolyester is derived from ethylene glycol, terephthalic acid and isophthalic acid. The preferred molar ratio of the first dicarboxylic acid (preferably terephthalic acid) to the second dicarboxylic acid (preferably isophthalic acid) is in the range of from 50:50 to 90:10, preferably in the range from 65:35 to 85:15, and is preferably about 82:18.

In a further embodiment, hereinafter referred to as Embodiment A2, the second layer comprises a copolyester derived from an first diol (preferably an aliphatic diol, preferably ethylene glycol or butane diol, more preferably ethylene glycol) and a second diol (preferably a cycloaliphatic diol, for instance 1,4-cyclohexanedimethanol) with one or more, preferably one, dicarboxylic acid(s), preferably an aromatic dicarboxylic acid. Examples include copolyesters of terephthalic acid with an aliphatic diol and a cycloaliphatic diol, especially ethylene glycol and 1,4-cyclohexanedimethanol. The preferred molar ratios of the second diol (preferably cycloaliphatic) to the first diol (preferably aliphatic) are in the range from 10:90 to 60:40, preferably in the range from 20:80 to 40:60, and more preferably from 30:70 to 35:65. In a preferred embodiment this copolyester is a copolyester of terephthalic acid with about 33 mole % 1,4-cyclohexane dimethanol and about 67 mole % ethylene glycol. An example of such a polymer is PETG™6763 (Eastman) which comprises a copolyester of terephthalic acid, about 33% 1,4-cyclohexane dimethanol and about 67% ethylene glycol and which is always amorphous. In an alternative embodiment of the invention, the polymer of the second layer may comprise butane diol in place of ethylene glycol.

In a further embodiment, hereinafter referred to as Embodiment A3, the second layer comprises an aromatic dicarboxylic acid and an aliphatic dicarboxylic acid. A preferred aromatic dicarboxylic acid is terephthalic acid. Preferred aliphatic dicarboxylic acids are selected from sebacic acid, adipic acid and azelaic acid. The concentration of the aliphatic dicarboxylic acid present in the copolyester is preferably in the range from 20 to 55, more preferably 30 to 50, and particularly 35 to 45 mole % based on the dicarboxylic acid components of the copolyester. Particularly preferred examples of such copolyesters are (i) copolyesters of azeleic acid and terephthalic acid with an aliphatic glycol, preferably ethylene glycol; (ii) copolyesters of adipic acid and terephthalic acid with an aliphatic glycol, preferably ethylene glycol; and (iii) copolyesters of sebacic acid and terephthalic acid with an aliphatic glycol, preferably butylene glycol. Preferred polymers include a copolyester of sebacic acid/terephthalic acid/butylene glycol (preferably having the components in the relative molar ratios of 45-55/55-45/100, more preferably 50/50/100) having a glass transition point ($T_g$) of −40° C. and a melting point ($T_m$) of 117° C.), and a copolyester of azeleic acid/terephthalic acid/ethylene glycol (preferably having the components in the relative molar ratios of 40-50/60-50/100, more preferably 45/55/100) having a $T_g$ of −15° C. and a $T_m$ of 150° C.

In a further alternative embodiment, hereinafter referred to as Embodiment A4, the additional heat-sealable layer comprises an ethylene vinyl acetate (EVA). Suitable EVA polymers may be obtained from DuPont as Elvax resins. Typically, these resins have a vinyl acetate content in the range of 9% to 40%, and typically 15% to 30%.

In one embodiment, hereinafter referred to as Embodiment B1, the second layer comprises a copolyester derived from a first aromatic dicarboxylic acid (preferably terephthalic acid), a low molecular weight aliphatic diol (preferably ethylene glycol) and a poly(alkylene oxide) glycol, a further dicarboxylic acid which imparts heat-sealability (preferably an aromatic dicarboxylic acid such as isophthalic acid). In this embodiment, the poly(alkylene oxide)glycol is present in the amounts described hereinabove in respect of the copolyester of the first layer. The first dicarboxylic acid is preferably present in amounts of from 50 to 90 mol % of the total acid component. The heat-sealing dicarboxylic acid (preferably isophthalic acid) is preferably present in an amount of from about of from 10 to about 50 mol % (preferably about 15 to 35 mol %, preferably about 18%) of the total dicarboxylic acid component. A preferred copolyester for the heat-sealable copolyester of Embodiment B1 is derived from poly(alkylene oxide)glycol, ethylene glycol, terephthalic acid and isophthalic acid. Optionally, the second layer copolyester of Embodiment B1 may also comprise a further dicarboxylic acid monomeric unit and this is selected from the "second dicarboxylic acid" defined hereinabove in respect of the copolyester of the first layer. If present in the heat-sealable copolyester of Embodiment B1, this "second dicarboxylic acid" is preferably selected from the sulphonated aromatic dicarboxylic acids (preferably sodium sulpho-isophthalic acid) described hereinabove. Thus, the copolyester would then preferably be derived from poly(alkylene oxide) glycol, ethylene glycol, terephthalic acid, isophthalic acid and a sulponated aromatic dicarboxylic acid (preferably sodium sulpho-isophthalic acid) as defined herein, in which the sulphonated acid is present in amounts of from about 1 to about 10 mol % (more typically about 1 to 6%) of the total acid component, and the isophthalic acid is present in amounts of from about 10 to about 50 mol % the total acid component. Typically, however, said "second dicarboxylic acid" is not present in the heat-sealable copolyester of Embodiment B1.

In a further embodiment, hereinafter referred to as Embodiment B2, the second layer comprises a copolyester derived from a first dicarboxylic acid (preferably aromatic), a first low molecular weight diol (preferably an aliphatic diol, preferably ethylene glycol or butane diol, more preferably ethylene glycol) and a poly(alkylene oxide) glycol, and a second low molecular weight diol which imparts heat-sealability (preferably a cycloaliphatic diol, for instance 1,4-cyclohexanedimethanol). Optionally, the "second dicarboxylic acid" defined hereinabove may also be present in the copolyester but preferably only one dicarboxylic acid residue is present. Examples of Embodiment B2 include copolyesters of an aromatic dicarboxylic acid (preferably terephthalic acid) with a poly(alkylene oxide) glycol, an aliphatic diol and a cycloaliphatic diol, especially ethylene glycol and 1,4-cyclohexanedimethanol. The first low molecular weight diol is preferably present in amounts of 40 to 90 mol % of the total glycol fraction, preferably in the range from 50 to 80 mol %. The second low molecular weight diol is preferably present in amounts of 10 to 40 mol % of the total glycol fraction. The poly(alkylene oxide) glycol is preferably present in amounts of 10 to 40 mol % of the total glycol fraction.

The thickness of the second layer is preferably no more than 12 µm, preferably no more than 10 µm, preferably no more than 6 µm, and preferably no more than 2 µm. The lower limit of thickness is typically 0.05 µm, more typically 0.5 µm. Preferably, the thickness of the second layer is no more than 15% (preferably no more than 10% and preferably no more than 5%) of the thickness of the first layer, particularly when the second layer is formed by co-extrusion.

Formation of the composite film is effected by conventional techniques well-known in the art. In general terms the process comprises the steps of extruding one or more layers of molten polymeric material, quenching the extrudate and orienting the quenched extrudate in at least one direction.

The composite film may be uniaxially oriented, but is preferably biaxially oriented by drawing in two mutually perpendicular directions in the plane of the film to achieve a satisfactory combination of mechanical and physical properties. Orientation may be effected by any process known in the art for producing an oriented film, for example a tubular or flat film process. In the preferred flat film process, the film-forming polymeric material are extruded through a slot die and rapidly quenched upon a chilled casting drum to ensure that the polymer is quenched to the amorphous state. Orientation is then effected by stretching the quenched extrudate in at least one direction at a temperature above the glass transition temperature of the polymeric material. Sequential orientation may be effected by stretching a flat, quenched extrudate firstly in one direction, usually the longitudinal direction, i.e. the forward direction through the film stretching machine, and then in the transverse direction. Forward stretching of the extrudate is conveniently effected over a set of rotating rolls or between two pairs of nip rolls, transverse stretching then being effected in a stenter apparatus. Alternatively, the cast film may be stretched simultaneously in both the forward and transverse directions in a biaxial stenter. Stretching is effected to an extent determined by the nature of the polymeric material, for example polyethylene terephthalate is usually stretched so that the dimension of the oriented film is from 2 to 5, more preferably 2.5 to 4.5 times its original dimension in the or each direction of stretching. Typically, stretching is effected at temperatures in the range of 50 to 125° C. Greater draw ratios (for example, up to about 8 times) may be used if orientation in only one direction is required. It is not necessary to stretch equally in the machine and transverse directions although this is preferred if balanced properties are desired.

A stretched film may be, and preferably is, dimensionally stabilised by heat-setting under dimensional restraint at a temperature above the glass transition temperature of the polymeric material but below the melting temperature thereof, to induce crystallisation of the polymer. In applications where film shrinkage is not of significant concern, the film may be heat set at relatively low temperatures or not at all. On the other hand, as the temperature at which the film is heat set is increased, the tear resistance of the film may change. Thus, the actual heat set temperature and time will vary depending on the composition of the film but should not be selected so as to substantially degrade the tear resistant properties of the film. Within these constraints, a heat set temperature of about 135° to 250° C. is generally desirable, as described in GB-A-838708.

Formation of the heat-sealable (second) layer and application thereof to the first layer may be effected by conventional techniques, and typically depends on the identity of the heat-sealable layer. Conventional techniques include casting or coating the heat-sealable second layer onto a preformed first layer, or by coextrusion of the first and second layers. In one embodiment, the formation of the heat-sealable (second) layer and the first layer is effected by coextrusion, which would be suitable for Embodiments A1, A2, B1 and B2 above. Other methods of forming the heat-sealable (second) layer include coating the heat-sealable polymer onto the first layer, and this technique would be suitable for Embodiments A3 and A4 above. Coating may be effected using any suitable coating technique, including gravure roll coating, reverse roll coating, dip coating, bead coating, extrusion-coating, melt-coating or electrostatic spray coating. Coating may be conducted "off-line", i.e. after any stretching and subsequent heat-setting employed during manufacture of the first layer, or "in-line", i.e. wherein the coating step takes place before, during or between any stretching operation(s) employed. Preferably, coating is performed in-line, and preferably between the forward and sideways stretches of a biaxial stretching operation ("inter-draw" coating). Prior to application of the heat-sealable (second) layer onto the first layer, the exposed surface of the first layer may, if desired, be subjected to a chemical or physical surface-modifying treatment to improve the bond between that surface and the subsequently applied layer. For example, the exposed surface may be subjected to a high voltage electrical stress accompanied by corona discharge. Alternatively, the first layer may be pretreated with an agent known in the art to have a solvent or swelling action on the substrate, such as a halogenated phenol dissolved in a common organic solvent e.g. a solution of p-chloro-m-cresol, 2,4-dichlorophenol, 2,4,5- or 2,4,6-trichlorophenol or 4-chlororesorcinol in acetone or methanol.

The composite film of the present invention preferably has an elongation to break of less than 250%, preferably less than 200%.

According to a further aspect of the present invention, there is provided a process for producing a breathable, heat-sealable composite film, said process comprising:
(i) providing a first layer of polymeric material comprises copolyester comprising monomeric units derived from one or more diol(s); one or more dicarboxylic acid(s); and one or more poly(alkylene oxide)glycol(s); and
(ii) providing on a surface of the first layer a heat-sealable second polymeric layer.

One or more of the layers of the polymeric film may conveniently contain any of the additives conventionally employed in the manufacture of polymeric films. Thus, agents such as cross-linking agents, dyes, pigments, voiding agents, lubricants, anti-oxidants, radical scavengers, UV absorbers, thermal stabilisers, anti-blocking agents, surface active agents, slip aids, optical brighteners, gloss improvers, prodegradents, viscosity modifiers and dispersion stabilisers may be incorporated as appropriate. In particular the composite film may comprise a particulate filler which may, for example, be a particulate inorganic filler or an incompatible resin filler or a mixture of two or more such fillers. Such fillers are well-known in the art. Particulate inorganic fillers include conventional inorganic fillers, and particularly metal or metalloid oxides, such as alumina, silica and titania, calcined china clay and alkaline metal salts, such as the carbonates and sulphates of calcium and barium. Preferred particulate inorganic fillers include titanium dioxide and silica. The inorganic filler is preferably finely-divided. The components of the composition of a layer may be mixed together in a conventional manner. For example, by mixing with the monomeric reactants from which the layer polymer is derived, or the components may be mixed with the polymer by tumble or dry blending or by compounding in an extruder, followed by cooling and, usually, commination into granules or chips. Masterbatching technology may also be employed.

In the preferred embodiment, the film of the present invention is optically clear, preferably having a % of scattered visible light (haze) of <10%, preferably <6%, more preferably <5% and particularly <2%, measured according to the standard ASTM D 1003. Preferably, the total light transmission (TLT) in the range of 400-800 nm is at least 75%, preferably at least 80%, and more preferably at least 90%, measured according to the standard ASTM D 1003. In this embodiment, filler (if present) is typically present in only small amounts, generally not exceeding 0.5% and preferably less than 0.2% by weight of the polymer of a given layer.

The primary use of the film of the present invention is as a breathable film for packaging freshly cut plants such as flowers, vegetables, fruit and salads. The film described herein provides a physical barrier to entry of external contaminants, such as insects, bacteria and air-borne contaminants, which would spoil the substance contained within the packaging during transport and storage, while at the same time allowing egress of water vapour. The film may make up all or substantially all of the packaging for such products, or may comprise only part of the total packaging. For instance, the film may form a heat-sealed lid onto a receptacle in or on which the goods are disposed. The receptacle may be a tray such as a thermoformed tray or bowl, and may, for instance be formed of polyester, such as polyethylene terephthalate, or of polypropylene, polystyrene, or may be PVDC-coated. A film according to the invention is particularly suitable for use as a lid on a receptacle made from, for instance, polyester, polystyrene or polypropylene. Sealing of the receptacle is effected by techniques well-known to those skilled in the art. Once the contents to be packaged have been introduced into the receptacle, the heat-sealable film lid is placed upon the receptacle such that the heat-sealable layer of the film is in contact with the receptacle, and is affixed using temperature and/or pressure using conventional techniques and equipment. In an alternative embodiment, the film is heat-sealed to itself to form substantially all of the packaging.

In an alternative embodiment, the film is heat-sealed to itself to form substantially all of the packaging. In this embodiment, the seal is provided by heat-sealing a first portion of the film to a second portion of the film. Such seals are effected by conventional techniques and include "fin seals" and "overlap seals", preferably fin seals. Once the product is placed within the film, the two portions of the film which are to be bonded together are brought together with the heat sealable surface of one film portion being in contact with the heat sealable surface of the other film portion, and the heat-seal bond formed by the application of temperature and optionally pressure using conventional equipment. The heat-seal bond is typically formed at temperatures in the range of about 120 to about 200° C., preferably about 140 to about 200° C.

The first surface of the substrate is the surface which is outermost when the film is used as such packaging, the second surface being the surface which is innermost and faces the goods to be packaged.

In a further aspect, the present invention provides the use of a film as described herein as a breathable film in the packaging of cut plant(s), for instance flowers or foodstuffs (including vegetables, fruits and salads), particularly wherein said packaging comprises the film as a lidding film and further comprises a receptacle.

In a further aspect, the present invention provides the use of a film as described herein as packaging for cut plant(s), for instance flowers or foodstuffs (including vegetables, fruits and salads), particularly wherein said packaging comprises the film as a lidding film and further comprises a receptacle, for the purpose of improving the breathability of said packaging and/or extending the shelf-life of said cut plants.

In a further aspect the invention provides a method of packaging cut plant(s), for instance flowers or foodstuffs (including vegetables, fruits and salads), said method comprising the step of providing a film as described herein as at least part of said packaging, and particularly wherein said packaging comprises said film as a lidding film and further comprises a receptacle.

In a further aspect the invention provides a method of improving the breathability of packaging of cut plant(s) and/or extending the shelf-life of said cut plants, wherein for instance said cut plant(s) are flowers or foodstuffs (including vegetables, fruits and salads), said method comprising the step of providing a film as described herein as at least part of said packaging, and particularly wherein said packaging comprises said film as a lidding film and further comprises a receptacle.

In a further aspect, the invention provides a sealed container comprising a receptacle containing cut plant(s), for instance flowers or foodstuffs (including vegetables, fruits and salads), and a lid formed from a polymeric film as defined herein.

In a further aspect, the invention provides a packaged, sealed product comprising cut plant(s), for instance flowers or foodstuffs (including vegetables, fruits and salads), wherein the packaging which effects and forms the seal around the food product is a composite film as defined herein which is heat-sealed to itself.

The following test methods may be used to characterise the polymeric film:
(i) Clarity of the film is evaluated by measuring total light transmission (TLT) and haze (% of scattered transmitted visible light) through the total thickness of the film using a Gardner XL 211 hazemeter in accordance with ASTM D-1003-61.
(ii) Heat-seal strength of the heat-sealable layer to itself is measured by positioning together and heating the heat-sealable (second) layers of two samples of polyester film at 140° C. for one second under a pressure of 275 kPa (40 psi). The sealed film is cooled to room temperature, and the sealed composite cut into 25 mm wide strips. The heat-seal strength is determined by measuring the force required under linear tension per unit width of seal to peel the layers of the film apart at a constant speed of 4.23 mm/second.
(iii) Heat-seal strength to a standard APET/CPET tray is measured by the following procedure. The coated film is sealed, by means of the coating layer, to a standard APET/CPET tray (manufactured by Faerchplast) using a Microseal PA 201 (Packaging Automation Ltd, England) tray sealer at a temperature of 180° C., and pressure of 80 psi for one second. Strips (25 mm) of the sealed film and tray are cut out at 90° to the seal, and the load required to pull the seal apart measured using an Instron Model 4301 operating at a crosshead speed of 0.2 m.min$^{-1}$. The procedure is repeated and a mean value of 5 results calculated.
(iv) Delamination Bond Strength is measured by the following procedure. Using a straight edge and a calibrated sample cutter (25 mm+\−0.5 mm) five strips of laminate of minimum length 100 mm are cut. Peel between the laminated layers is initiated at one end of each sample and the laminates peeled apart over a distance of approximately 40 mm in length. Each sample in turn is tested using an Instron model 4464 materials test machine, using pneumatic action grips with rubber jaw faces. Crosshead speed is 50 mm\min$^{-1}$. The samples are inserted into the Instron jaws with one layer clamped in the fixed jaws and the other half in the moving jaws ensuring that an equal amount of each layer is held in each jaw to allow the laminate to be pulled apart evenly. The equipment records the mean peel strength of each sample between 10 mm and 50 mm and the bond strength of the laminate is quoted as an average of 5 samples in g\25 mm.
(v) Water vapour transmission rates are measured using a Lyssy Water Vapour Permeation Tester model number L80 4000J. Test samples are prepared by cutting around a template (100×110 mm). Once cut to size samples are sealed into a standard Lyssy sample holder card by placing in a hydraulic press for approximately 5 minutes at a pressure of 2 tonnes.
Prior to testing the equipment is calibrated using standard 19 micron and 36 micron PET film (Melinex® S; DuPont Teijin Films; m.p. 248° C.; relative density at 23° C. of 1.40). In order to keep the conditioning and measuring chambers apart an impermeable foil laminate is used in between testing of samples. During sample changeover the test specimen and the foil layer are placed on top of each other to ensure that at no time the measuring chamber is directly exposed to the conditioning chamber.
Testing is carried out at a temperature of 38° C. and at 90% relative humidity. Equilibrium is reached when consecutive results change by less than 2% indicated by an asterisk on the equipment printout. Water vapour transmission rate quoted in g/m$^2$/day is recorded when 5 consecutive asterisks are seen on the printout.
(vi) Elongation At Break is measured according to test method ASTM D882. Using a straight edge and a calibrated sample cutter (25 mm+\−0.5 mm) five strips (100 mm in length) of the film long are cut along machine direction. Each sample is tested using an Instron model 3111 materials test machine, using pneumatic action grips with rubber jaw faces. Temperature and relative humidity (23° C., 50% rh) are controlled. The crosshead speed (rate of separation) is 25 mm.min$^{-1}$. The strain rate is 50%. It is calculated by dividing the rate of separation by the initial distance between grips (sample length). The equipment records the elongation at break of each sample. The Elongation At Break ($\epsilon_B$ (%)) is defined as:

$$\epsilon_B (\%) = (\text{extension at break}/L_0) \times 100$$

where $L_0$ is the original length of the sample between grips.

The invention is further illustrated by the following examples. It will be appreciated that the examples are for illustrative purposes only and are not intended to limit the invention as described above. Modification of detail may be made without departing from the scope of the invention.

EXPERIMENTAL

Mono-Layer Films

A series of copolyesters were made using terephthalic acid, ethylene glycol and a third component, as set out in Table 1. The mol % of the third component (either a poly(alkylene oxide) glycol or a second dicarboxylic acid) is given in Table 1 as the mol % of the diol and/or diacid fraction in the final copolyester, respectively. The copolyesters were made using conventional techniques either via the trans-esterification route (using the dimethyl ester of terephthalic acid) or via direct esterification.

These copolyesters were then extruded through a film-forming die on to a water-cooled rotating, quenching drum at various line speeds to yield an amorphous cast composite extrudate. The cast extrudate was heated to a temperature of between about 70 and 105° C. (the actual temperature used being dependent on the polymeric material in that a lower temperature was used for a softer polymer (i.e. one having a lower Tg)) and then stretched longitudinally at a forward draw ratio of about 3:1. The polymeric film was passed into a stenter oven at a temperature of about 100° C., where the sheet was stretched in the sideways direction to approximately 4 times its original dimensions. The biaxially stretched polymeric film was optionally heat-set at the temperatures given in Table 1 below, which also shows the final thicknesses and WVTR data of the films. The films were clear; for example the film of Example 1 had a haze of 1.5%. For the purposes of comparison, a standard PET monolayer (19 μm) film has a WVTR of 20 g/m²/day.

TABLE 1

| Polymer Sample | Additional Monomer Identity | Mol % | Thickness (μm) | Process Conditions | WVTR (g/m²/day) |
|---|---|---|---|---|---|
| 1 | Terethane ® 650 | 22 | 16 | (a) | 169 |
|   |   |   | 23 |   | 131 |
| 2 | Terethane ® 1000 | 22 | 14 | (a) | 150 |
|   |   |   | 17 | (a) | 128 |
|   |   |   | 23 | (b) | 65 |
| 3 | PEG 1000 | 37 | 12 | (a) | 440 |
|   |   |   | 15 | (a) | 293 |
|   |   |   | 22 | (a) | 121 |
|   |   |   | 22 | (c) | 164 |
| 4 | PEG 4000 | 28 | 11 | (a) | 296 |
|   |   |   | 15 | (a) | 169 |
|   |   |   | 20 | (a) | 122 |
|   |   |   | 10 | (b) | 213 |
|   |   |   | 12 | (b) | 180 |
| 5 | PEG 4000 | 38 | 10 | (a) | 520 |
|   |   |   | 17 | (b) | 308 |
| 6 | PEG 8000 | 27 | 10 | (a) | 187 |
|   |   |   | 12 | (b) | 117 |
| 7 | PEG 10000 | 24 | 11 | (a) | 182 |
|   |   |   | 17 | (a) | 129 |
|   |   |   | 11 | (b) | 110 |
| 8 | PPG | 32 | 10 | (a) | 240 |
|   |   |   | 17 | (b) | 135 |
| 9 | Azelaic Acid & PEG4000 | 9 & 27 | 11 | (a) | 515 |
|   |   |   | 19 | (a) | 294 |
|   |   |   | 11 | (b) | 520 |
|   |   |   | 18 | (c) | 312 |

Process Conditions in Table 1:
  (a) no heat-setting;
  (b) heat set at 220° C. for 15 seconds;
  (c) heat set at 180° C. for 15 seconds.
Polymer Grades used in the polymers used in Table 1:
  The Terethane® copolymers are poly(tetramethylene oxide) glycols obtained from DuPont, US;
  The PEG materials were obtained from Aldrich (Gillingham, UK);
  The PPG materials were obtained from Aldrich (Gillingham, UK).

The data in Table 1 demonstrate the utility of poly(alkylene oxide) glycols in imparting breathability to a PET polymeric film.

Composite Films

Composite films were also manufactured by coextrusion in which the first layer was a breathable copolyester as described hereinabove and the second layer was a breathable heat-sealable polymeric layer. The copolymeric materials were derived by reacting terephthalic acid, ethylene glycol and a third and optionally a fourth component to form copolymers P1, P2, P3, P4, HS1 and HS2 as set below. The mol % value is that measured in the final polymer.

P1: PEG 1000 at a level of 26% of the glycol fraction
P2: PEG 1000 at a level of 37% of the glycol fraction
P3: PEG 3350 at a level of 31% of the glycol fraction
P4: PEG 3350 at a level of 33.5% of the glycol fraction; and sodium sulpho-isophthalic acid at a level of 1.4% of the acid fraction
HS1: isophthalic acid at a level of 18% of the acid fraction
HS2: PEG 400 at a level of 10% of the glycol fraction; and isophthalic acid at a level of 18% of the acid fraction The copolyesters were coextuded using separate streams supplied from separate extruders, to a single channel coextrusion assembly. The polymer layers were extruded through a film-forming die on to a water-cooled rotating, quenching drum at various line speeds to yield an amorphous cast composite extrudate. The cast extrudate was heated to a temperature in the range of about 50 to 80° C. and then stretched longitudinally at a forward draw ratio of about 3:1. The polymeric film was passed into a stenter oven at a temperature of about 110° C., where the sheet was stretched in the sideways direction to approximately 4 times its original dimensions, and then heat-set at temperatures between 210 and 225° C. The final thickness of the film was 23 μm, in which the second (heat-sealable) layer was 10-15% of the thickness of the first layer. The films were clear; Example 6 for instance had a haze of 4.5%. The WVTR of the films are given in Table 2.

TABLE 2

| Film Example | COPOLYESTERS | | WVTR (g/m²/day) |
|---|---|---|---|
| | 1st Layer | 2nd Layer | |
| Control | PET | HS1 | 22 |
| 1 | P1 | HS1 | 61 |
| 2 | P1 | HS2 | 75 |
| 3 | P2 | HS1 | 84 |
| 4 | P2 | HS2 | 111 |
| 5 | P3 | HS2 | 94 |
| 6 | P4 | HS2 | 120 |

The invention claimed is:

1. A breathable, heat-sealable composite film comprising first and second layers of polymeric material wherein:
  (i) the polymeric material of the first layer comprises a copolyester comprising monomeric units derived from one or more diol(s); one or more dicarboxylic acid(s), wherein at least one of said one or more dicarboxylic acids is an aromatic acid; and one or more poly(alkylene oxide)glycol(s);
  (ii) the second layer is a heat-sealable polymeric layer;
  (iii) the composite film has an elongation to break of less than 250%; and (iv) the poly(alkylene oxide) glycol of the first layer constitutes in the range of 10 to 40 mol % of all diol and glycol monomeric units of the first layer;

wherein the polymeric material of the first layer comprises greater than 50% of the copolyester by weight, relative to the total amount of polymeric material in the first layer, and wherein the composite film is uniaxially or biaxially oriented.

2. The film according to claim 1 wherein the film is permeable to gaseous water.

3. The film according to claim 1 wherein the poly(alkylene oxide) glycol is selected from the group consisting of polyethylene glycol (PEG), polypropylene glycol (PPG) and poly(tetramethylene oxide) glycol (PTMO).

4. The film according to claim 1 wherein the poly(alkylene oxide) glycol is polyethylene glycol.

5. The film according to claim 1 wherein the average molecular weight of the poly(alkylene oxide) glycol is from about 400 to about 10000.

6. The film according to claim 1 wherein the average molecular weight of the poly(alkylene oxide) glycol is from about 400 to about 4500.

7. The film according to claim 1 wherein the copolyester of the first layer comprises terephthalic acid.

8. The film according to claim 1 wherein the copolyester of the first layer comprises an aliphatic diol.

9. The film according to claim 1 wherein the copolyester of the first layer comprises ethylene glycol.

10. The film according to claim 1 wherein said one or more dicarboxylic acid(s) comprises a first aromatic dicarboxylic acid and a second dicarboxylic acid.

11. The film according to claim 10 wherein said first aromatic dicarboxylic acid is terephthalic acid.

12. The film according to claim 11 wherein said second dicarboxylic acid is a sulphonated aromatic dicarboxylic acid.

13. The film according to claim 12 wherein said second dicarboxylic acid is sodium sulpho-isophthalic acid.

14. The film according to claim 11 wherein said second dicarboxylic acid is an aliphatic dicarboxylic acid.

15. The film according to claim 14 wherein said second dicarboxylic acid is adipic acid or azelaic acid.

16. The film according to claim 10 wherein the first dicarboxylic acid constitutes from 50 to 100 mol % of all dicarboxylic acid monomeric units, and the second dicarboxylic acid constitutes from 0 to 50 mol % of all dicarboxylic acid monomeric units.

17. The film according to claim 1 wherein the thickness of the first layer is in the range of from about 0.5 to about 300 µm.

18. The film according to claim 1 wherein the heat-sealable second layer is derived from a first dicarboxylic acid, a first low molecular weight diol, and either a second dicarboxylic acid or a second low molecular weight diol.

19. The film according to claim 18 wherein the heat-sealable second layer is a copolyester derived from ethylene glycol, terephthalic acid and isophthalic acid.

20. The film according to claim 18 wherein the heat-sealable second layer is a copolyester derived from terephthalic acid, ethylene glycol and 1,4-cyclohexanedimethanol.

21. The film according to claim 1 wherein the polymeric material of the heat-sealable second layer is derived from a first aromatic dicarboxylic acid, a low molecular weight aliphatic diol, a poly(alkylene oxide) glycol, and a further dicarboxylic acid which imparts heat-sealability.

22. The film according to claim 21 wherein said first aromatic dicarboxylic acid is terephthalic acid, and/or said low molecular weight aliphatic diol is ethylene glycol, and/or said further dicarboxylic acid which imparts heat-sealability is isophthalic acid.

23. The film according to claim 21 wherein said first dicarboxylic acid constitutes from 50 to 90 mol % of all dicarboxylic acid monomeric units.

24. The film according to claim 21 wherein said low molecular weight diol constitutes from 60 to 90 mol % of all diol and glycol monomeric units.

25. The film according to claims 21 wherein the poly(alkylene oxide) glycol is poly(ethylene oxide) glycol.

26. The film according to claim 1 wherein the composite film is a coextruded composite film.

27. The film according to claim 1 wherein the heat-sealable second layer comprises a copolyester derived from an aromatic dicarboxylic acid and an aliphatic dicarboxylic acid.

28. The film according to claim 1 wherein the heat-sealable second layer comprises ethylene vinyl acetate (EVA).

29. The film according to claim 1 wherein the thickness of the second layer is in the range of from about 0.05 to about 20 µm.

30. The film according to claim 1 wherein the composite film exhibits a water vapour transmission rate (WVTR) of at least 60 g/m$^2$/day.

31. The film according to claim 1 wherein the copolyester of the first layer has a glass transition temperature (Tg) of at least 0° C. and no more than 60° C.

32. A breathable, heat-sealable composite film comprising first and second layers of polymeric material wherein:
(i) the polymeric material of the first layer comprises a copolyester comprising monomeric units derived from one or more diol(s); one or more dicarboxylic acid(s), wherein at least one of said one or more dicarboxylic acids is an aromatic acid; and one or more poly(alkylene oxide)glycol(s);
(ii) the second layer is a heat-sealable polymeric layer;
(iii) the composite film has an elongation to break of less than 250%; and
(iv) the poly(alkylene oxide) glycol of the first layer constitutes in the range of 10 to 40 mol % of all diol and glycol monomeric units of the first layer;
wherein the polymeric material of the first layer comprises greater than 50% of the copolyester by weight, relative to the total amount of polymeric material in the first layer, and wherein the composite film exhibits a haze of less than 6%.

33. A method of packaging cut plants, comprising heat-sealing the plants within a container comprising a breathable, heat-sealable composite film comprising first and second layers of polymeric material wherein:
(i) the polymeric material of the first layer comprises a copolyester comprising monomeric units derived from one or more diol(s); one or more dicarboxylic acid(s), wherein at least one of said one or more dicarboxylic acids is an aromatic acid; and one or more poly(alkylene oxide)glycol(s);
(ii) the second layer is a heat-sealable polymeric layer;
(iii) the composite film has an elongation to break of less than 250%; and
(iv) the poly(alkylene oxide) glycol of the first layer constitutes in the range of 10 to 40 mol % of all diol and glycol monomeric units of the first layer;
wherein the polymeric material of the first layer comprises greater than 50% of the copolyester by weight, relative to the total amount of polymeric material in the first layer.

34. The method according to claim 33 wherein the container further comprises a receptacle for the cut plants, wherein the film forms a lid for the receptacle, and wherein the step of heat-sealing comprises heat-sealing the film to the receptacle.

35. A sealed container comprising a receptacle containing cut plant(s), and a lid formed from a breathable, heat-sealable composite film comprising first and second layers of polymeric material wherein:
- (i) the polymeric material of the first layer comprises a copolyester comprising monomeric units derived from one or more diol(s); one or more dicarboxylic acid(s), wherein at least one of said one or more dicarboxylic acids is an aromatic acid; and one or more poly(alkylene oxide)glycol(s);
- (ii) the second layer is a heat-sealable polymeric layer;
- (iii) the composite film has an elongation to break of less than 250%; and
- (iv) the poly(alkylene oxide) glycol of the first layer constitutes in the range of 10 to 40 mol % of all diol and glycol monomeric units of the first layer;

wherein the polymeric material of the first layer comprises greater than 50% of the copolyester by weight, relative to the total amount of polymeric material in the first layer.

\* \* \* \* \*